US012781377B2

(12) United States Patent
Lyons

(10) Patent No.: US 12,781,377 B2
(45) Date of Patent: Nov. 3, 2026

(54) GRILLE SURROUND FOR A VEHICLE

(71) Applicant: International Truck Intellectual Property Company, LLC, Lisle, IL (US)

(72) Inventor: Timothy M. Lyons, Batavia, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 307 days.

(21) Appl. No.: 18/586,651

(22) Filed: Feb. 26, 2024

(65) Prior Publication Data

US 2025/0270728 A1 Aug. 28, 2025

(51) Int. Cl.

| | |
|---|---|
| ***C25D 17/00*** | (2006.01) |
| ***B62D 25/08*** | (2006.01) |
| ***C25D 3/04*** | (2006.01) |
| ***C25D 7/00*** | (2006.01) |

(52) U.S. Cl.

CPC ........... *C25D 17/005* (2013.01); *B62D 25/08* (2013.01); *C25D 3/04* (2013.01); *C25D 7/00* (2013.01)

(58) Field of Classification Search

CPC .............. B60R 19/52; B60R 2019/527; B60R 2019/525; C25D 7/00; C25D 3/04; C25D 17/005

USPC ........ 296/193.1; 293/115; 180/68.6; 205/122

See application file for complete search history.

(56) References Cited

U.S. PATENT DOCUMENTS

| | | | | |
|---|---|---|---|---|
| 6,805,213 | B2 | 10/2004 | Seffernick et al. | |
| 7,537,253 | B2 | 5/2009 | Rosen et al. | |
| 7,628,237 | B2 | 12/2009 | Marqueling et al. | |
| 11,628,787 | B2 * | 4/2023 | Mallicote ................ | B60R 19/52 293/115 |

FOREIGN PATENT DOCUMENTS

| | | | | |
|---|---|---|---|---|
| CN | 106627780 | B | | 1/2021 |
| DE | 202005022005 | | * | 4/2012 |
| EP | 3279628 | A1 | | 2/2018 |
| JP | H1234593 | A | * | 9/1998 |

* cited by examiner

*Primary Examiner* — Joseph D. Pape

(74) *Attorney, Agent, or Firm* — Umang Khanna

(57) ABSTRACT

A grille surround for a vehicle including a body, a plurality of mounting brackets connected to the body via an adhesive, and a plurality of conductive members configured to electrically couple the plurality of mounting brackets to the body. Each conductive member extends in between the body and a respective mounting bracket and establishes an electrical connection therebetween.

11 Claims, 3 Drawing Sheets

GRILLE SURROUND FOR A VEHICLE

BACKGROUND

This disclosure relates to grille surrounds for vehicle grilles. Particularly, this disclosure relates to distributing electrical current throughout a grille surround when chrome plating the grille surround.

RELATED ART

A grille surround is an aesthetic vehicle component that attaches to a vehicle and surrounds or otherwise covers the periphery of a vehicle grille, providing an aesthetically pleasing transition between the grille and the surrounding vehicle body. To maintain the aesthetic appearance of the exterior of the vehicle, it is desirable to attach the grille surround to the vehicle body using interior attachment mechanisms that are not visible from the exterior of the vehicle. Typically, a grille surround includes a metal body and mounting brackets connected to the rear of the body which receive fasteners therethrough. Thereby, the mounting brackets and fasteners are hidden from view by the body of the grille surround itself.

To further increase the aesthetic appearance of a grille surround it is common to chrome plate the grille surround. However, the process of chrome plating the grille surround can be arduous and may even degrade the usable lifetime of the grille surround. For example, during the chrome plating process, if the current is improperly distributed throughout the grille surround it can cause an uneven distribution of chrome or a poor adhesion thereof. In some grille surrounds, the mounting brackets are welded onto the main body, which creates a sound electrical connection between the body and the mounting brackets, resulting in an adequate distribution of the chrome due to the even distribution of current throughout the grille surround.

In other grille surrounds, the mounting brackets are connected to the body via an adhesive. Traditionally, in prior art grille surrounds which utilize adhesive connections between the mounting brackets and the body, any attempted chrome plating process results in a poor distribution of the chrome plating, causing significant structural issues. The non-conductive adhesive causes an inadequate flow of electrical current between the mounting brackets and the body which in turn causes the chrome to unevenly or incompletely coat the surface of the grille surround. Over time, this poor, or completely failed, chrome plating of the grille surround will cause corrosion and failure of the grille surround.

A common practice to avoid an inadequate application of chrome was to weld the mounting brackets onto the body. However, welding the mounting brackets onto the body is both costly and time consuming. If adhesive was used to connect the mounting brackets to the body, such as the grille surround of U.S. Pat. No. 7,537,253 B2, then skilled artisans would not attempt to chrome plate the grille surround and instead opt for a highly polished finish of the grille surround.

SUMMARY

According to one embodiment, a vehicle includes a grille surround for a vehicle including a body, a plurality of mounting brackets connected to the body via an adhesive, and a plurality of conductive members configured to electrically couple the plurality of mounting brackets to the body. Each conductive member extends in between the body and a respective mounting bracket and establishes an electrical connection therebetween.

According to another embodiment, a grille surround for a vehicle includes a body and a plurality of mounting brackets connected to the body via an electrically conductive adhesive. The electrically conductive adhesive is configured to evenly distribute electricity throughout the body and the plurality of mounting brackets during a chrome plating process such that the chrome plating is evenly distributed on the grille surround.

According to yet another embodiment, a method for chrome plating a component is provided. The method includes an initial step of providing a grille surround for a vehicle including a body, a plurality of mounting brackets connected to the body via an adhesive, and a plurality of conductive members configured to electrically couple the plurality of mounting brackets to the body. Each conductive member extends in between the body and a respective mounting bracket and establishes an electrical connection therebetween. The method includes a further step of chrome plating the grille surround such that the chrome plating is evenly distributed on the body and the plurality of mounting brackets due to the conductive members evenly distributing electricity throughout the body and the plurality of mounting brackets.

DETAILED DESCRIPTION

Embodiments described herein relate to arrangements for a grille surround with electrically conductive attachment points between the body and the mounting brackets to foster the flow of electrical current therebetween during a chrome plating process and thus create an even distribution of chrome plating. The apparatus and method may be applied to various types of vehicles. For non-limiting example, the apparatus and method may be applied to grille surrounds and other chrome plated components of passenger cars, light trucks, vans, cargo vehicles, heavy trucks, construction equipment, commercial vehicles, recreational vehicles, highway or semi-tractors, busses, fire trucks, motorcycles, bicycles, railed vehicles, watercraft, aircraft, autonomous or semi-autonomous vehicles. Moreover, the apparatus and method may be applied to chrome plated or otherwise plated components of other items, such as household appliances and fixtures, signage, tools, and etcetera.

Figure 1:
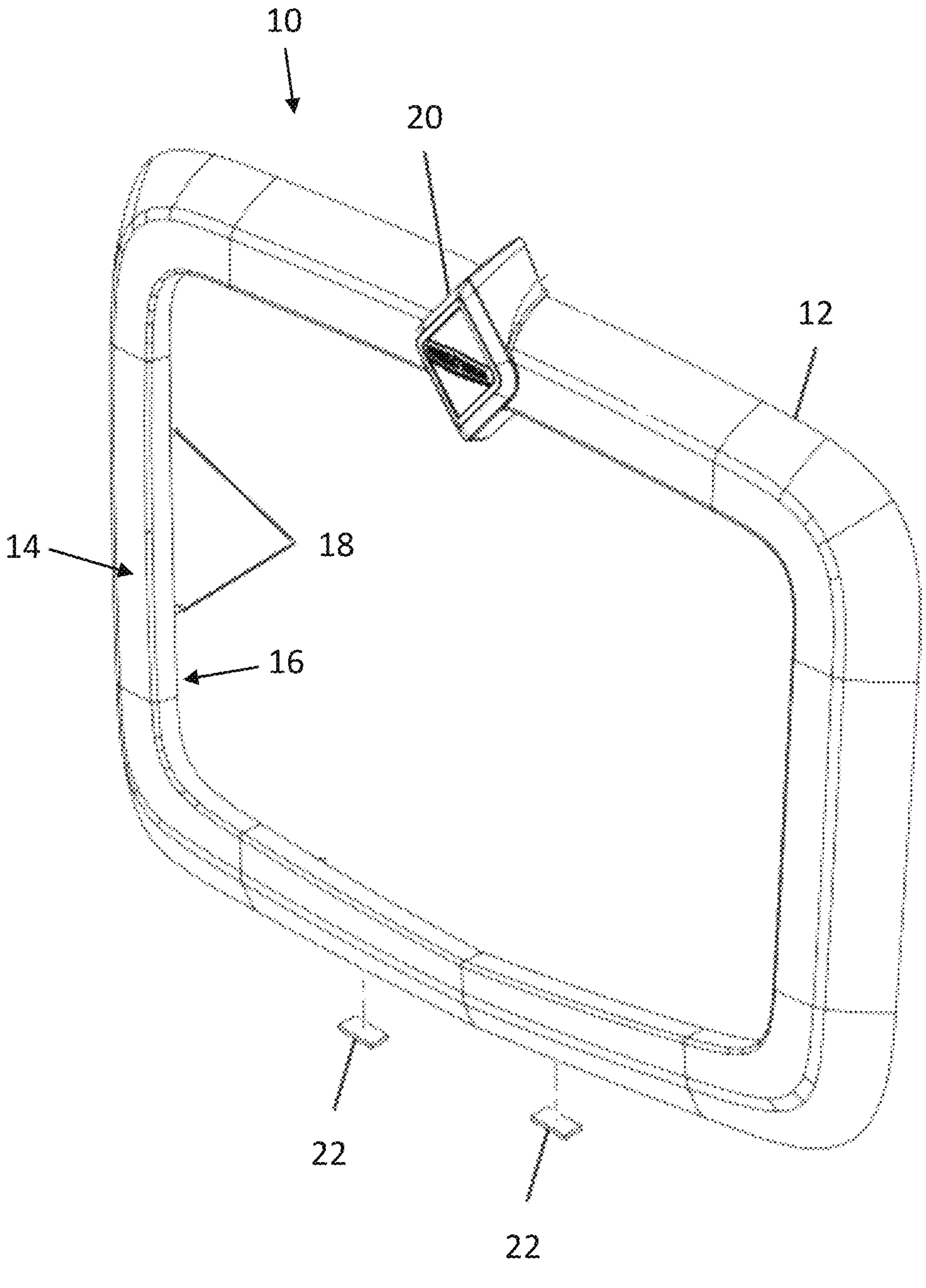
FIG. 1 is an elevated front perspective view of a grille surround of a vehicle.
Figure 2:
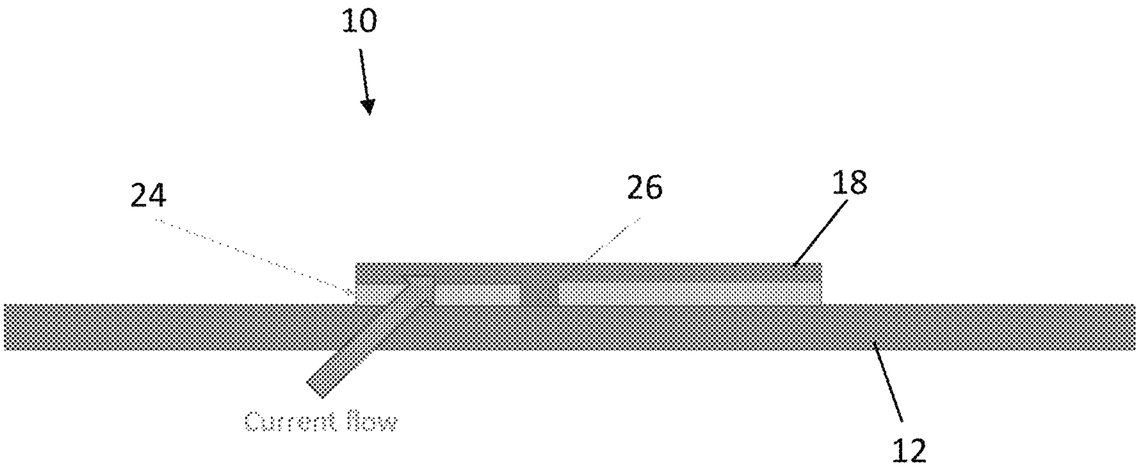
FIG. 2 is a graphical representation of the grille surrounding of FIG. 1, illustrating the connection between the body of the grille surround and a mounting bracket connected thereto.

Turning now to FIGS. 1 and 2, a grille surround 10 of a vehicle includes a body 12 with a front face 14 and a rear face 16, and a plurality of mounting brackets 18 connected to the body 12 and extending rearwardly therefrom. The grille surround 10 can further include a decorative emblem 20 mounted at the top of the body 12 via fasteners and inserts 22 for capping fastener through holes, creating a seamless appearance. The grille surround 10 is configured to cover at least a portion of a grille of a vehicle. Additionally, the grille surround 10 is configured to be chrome plated. During the chrome plating process, the grille surround 10 is configured to adequately distribute electrical current throughout its body 12 and the mounting brackets 18 such that the chrome is evenly applied thereon.

The body 12 of the grille surround 10 can have a shape and size which corresponds to the grille which it at least partially covers. The body 12 can have a substantially rectangular cross-section and define a center hole (unnumbered) for allowing air to pass therethrough and into the front of the grille. The body 12 can be comprised of any desired material, such as metal.

The brackets 18 can be connected to the body 12 by an adhesive 24 (FIG. 2). In the present embodiment, the adhesive 24 is a nonelectrically conductive adhesive 24. The adhesive 24 can be any desired adhesive, such as an epoxy. The brackets 18 can be connected to the rear of the body 12. The grille surround 10 can include any desired number of mounting brackets 18, such as two, four, eight, etc., mounting brackets 18. For example, each top, bottom, and side section of the body 12 can have a pair of brackets 18. Each bracket 18 can be in the form of a protrusion, a tab, a rod, a plate with a through hole therein, or any other desired bracket member to facilitate the connection of the grille surround 10 to the body 12 of the vehicle. In some embodiments, each bracket 18 can include a through hole which receives a fastener, such as a screw or bolt. The through hole in each bracket can be aligned with corresponding through holes in the body 12, which may be capped by the inserts 22. Each bracket 18 can comprise any desired electrically conductive material.

After application and curing of the adhesive 24, the whole assembly is then chrome plated. To foster an adequate flow of electrical current between the mounting brackets 18 and the body 12, the grille surround 10 further includes a conductive member 26 which extends in between the juxtaposed faces of the body 12 and each corresponding bracket 18. The conductive member 26 provides sufficient electrical connectivity to foster an adequate application of chrome onto the grille surround 10 yet it does not interfere with the adhesion of the bracket 18 onto the body 12. In other words, the conductive members 26 are configured to evenly distribute electricity throughout the body 12 and the brackets 18 during a chrome plating process such that the chrome plating is evenly distributed on the body 12 and the plurality of mounting brackets 18, eliminating corrosion and failure of the grille surround 10. During the chrome plating process, electrical current can be applied to one or more of the brackets 18 and/or the body 12. Thereafter, the current may flow to and/or from the bracket(s) 18, through the respective conductive member(s) 26. For example, the current may flow through the grille surround 10 as indicated by the reference arrow in FIG. 2.

Each conductive member 26 directly contacts the body 12 and each bracket 18. Each conductive member 26 can be connected to the body 12 and/or each respective bracket 18. For example, each conductive member 26 can be integrally formed with the body 12 and extend outwardly therefrom such that the end of each conductive member 26 contacts the opposing face of the bracket 18. Alternatively, for example, each conductive member 26 can be integrally formed with each respective bracket 18 and extend outwardly therefrom such that upon attaching the bracket 18 with the adhesive 24, the end of each conductive member 26 contacts the rear face 16 of the body 12. Each conductive member 26 is disposed between the body 12 and each respective bracket 18. Thereby, a thickness of the adhesive 24 between the body 12 and each bracket 18 matches a length of each conductive member 26. Additionally, each conductive member 26 is surrounded by the adhesive 24. The top and bottom of each conductive member 26 contacts the body 12 and each respective bracket 18, and the side surface(s) each conductive member 26 is completely surrounded by the adhesive 24. Given the position of each conductive member 26 being surrounded by the adhesive 24, each conductive member 26 has a width which is smaller than a width of a respective mounting bracket 18 to which it is attached.

In some embodiments, each conductive member 26 can be a button member 26. The button member 26 can extend outwardly from the rear face 16 of the body 12 and directly contact the opposing surface of the bracket 18. In some embodiments, each button member 26 can be a two-part button member with a male protrusion and a female receiving member, located on each bracket, which receives the protrusion therein. Thereby, the male and female components may dually rigidly attach and electrically couple the brackets 18 to the body 12. In one embodiment, each button member 26 is connected to a respective bracket 18 and an end thereof directly contacts the body 12. In another embodiment, each button member 26 is connected to the body 12 and an end thereof directly contacts a respective bracket 18.

Each conductive member 26 however can be variously configured. For example, each conductive member 26 can be a protrusion extending rearwardly from the body 12, a metal rod, a hollow tube, a tab, and/or a pin. Each conductive member 26 can have any desired shape, such as tubular, rectangular, pyramidal, etc. The conductive members 26 may or may not be identical to one another. Each conductive member 26 can comprise any desired material, such as metal.

Figure 3:
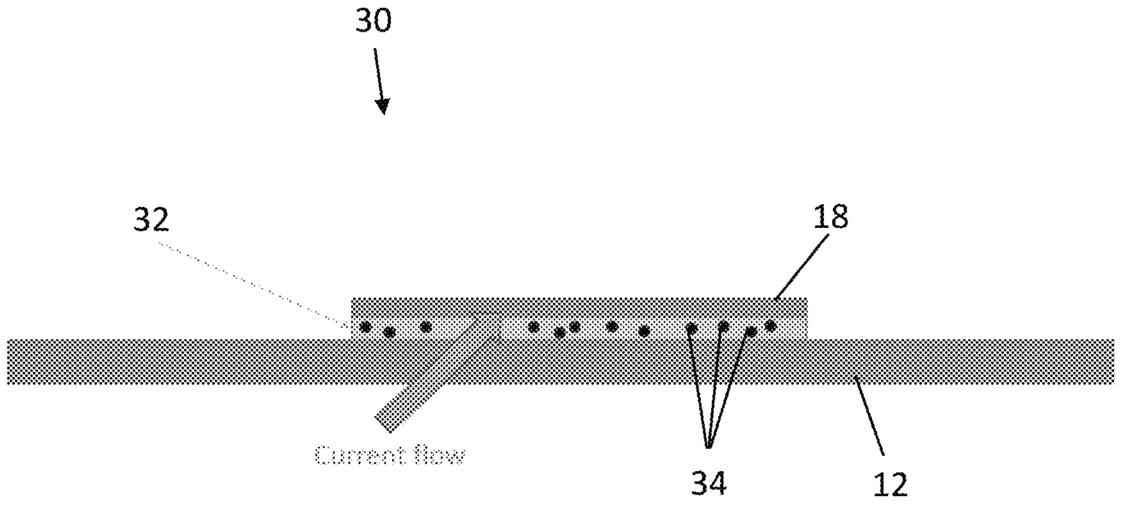
FIG. 3 is a graphical representation of another embodiment of a grille surround.

Referring now to FIG. 3 there is shown another embodiment of a grille surround 30. The grille surround 30 can be similar to the grille surround 10 as discussed above except that the adhesive 32 which couples each bracket 18 to the body 12 is electrically conductive. For example, the conductive members 34 can comprise conductive particles 34, such as particles of metal, disposed within the adhesive 32 for making the adhesive 32 electrically conductive and establishing the electrical connection between the body 12 and the mounting brackets 18.

While illustrative arrangements implementing the grille surround have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A grille surround for a vehicle, comprising:

a body;

a plurality of mounting brackets connected to the body via an adhesive; and a plurality of conductive members configured to electrically couple the plurality of mounting brackets to the body, each conductive member extending in between the body and a respective mounting bracket and establishing an electrical connection therebetween; wherein each conductive member of the plurality of conductive members is a metal rod.

2. The grille surround of claim 1, wherein:

the plurality of conductive members is configured to evenly distribute electricity throughout the body and the plurality of mounting brackets during a chrome plating process such that the chrome plating is evenly distributed on the body and the plurality of mounting brackets, eliminating corrosion and failure of the grille surround.

3. The grille surround of claim 1, wherein:

the body has a front face and a rear face; and each mounting bracket of the plurality of mounting brackets is connected to the rear face of the body and extends rearwardly therefrom.

4. The grille surround of claim 1, wherein:

each conductive member of the plurality of conductive members is a protrusion extending rearwardly from the body.

5. The grille surround of claim 1, wherein:

each conductive member of the plurality of conductive members is surrounded by the adhesive.

6. The grille surround of claim 1, wherein:

a thickness of the adhesive between the body and each mounting bracket of the plurality of mounting brackets matches a length of each conductive member of the plurality of conductive members.

7. The grille surround of claim 1, wherein:

each mounting bracket of the plurality of mounting brackets has associated therewith only one conductive member of the plurality of conductive members for establishing the electrical connection therebetween.

8. The grille surround of claim 1, wherein:

the adhesive is nonelectrically conductive.

9. The grille surround of claim 1, wherein:

the plurality of conductive members comprises a plurality of conductive particles disposed within the adhesive for making the adhesive electrically conductive and establishing the electrical connection between the body and the plurality of mounting brackets.

10. The grille surround of claim 1, wherein:

each conductive member of the plurality of conductive members has a width which is smaller than a width of a respective mounting bracket of the plurality of mounting brackets to which it is attached.

11. A method, comprising:

providing a grille surround for a vehicle including a body, a plurality of mounting brackets connected to the body via an adhesive, and a plurality of metal rods configured to electrically couple the plurality of mounting brackets to the body, each metal rod extending in between the body and a respective mounting bracket and establishing an electrical connection therebetween; and chrome plating the grille surround such that the chrome plating is evenly distributed on the body and the plurality of mounting brackets due to the conductive members evenly distributing electricity throughout the body and the plurality of mounting brackets.

* * * * *